United States Patent
Boughtwood

(10) Patent No.: US 12,191,708 B2
(45) Date of Patent: Jan. 7, 2025

(54) MOTOR/GENERATOR AND MOTOR DRIVE CIRCUIT

(71) Applicant: DEREGALLERA HOLDINGS LTD, Mid Glamorgan (GB)

(72) Inventor: Martin Hugh Boughtwood, Bristol (GB)

(73) Assignee: DEREGALLERA HOLDINGS LTD (GB)

( * ) Notice: Subject to any disclaimer, the term of this patent is extended or adjusted under 35 U.S.C. 154(b) by 582 days.

(21) Appl. No.: 17/601,898

(22) PCT Filed: Apr. 7, 2020

(86) PCT No.: PCT/EP2020/059926
§ 371 (c)(1),
(2) Date: Oct. 6, 2021

(87) PCT Pub. No.: WO2020/208037
PCT Pub. Date: Oct. 15, 2020

(65) Prior Publication Data
US 2022/0181921 A1  Jun. 9, 2022

(30) Foreign Application Priority Data
Apr. 8, 2019 (GB) .................................... 1904941

(51) Int. Cl.
| H02K 1/14 | (2006.01) |
| H02K 1/20 | (2006.01) |
| H02K 3/24 | (2006.01) |
| H02K 3/47 | (2006.01) |

(52) U.S. Cl.
CPC .............. *H02K 1/14* (2013.01); *H02K 1/20* (2013.01); *H02K 3/24* (2013.01); *H02K 3/47* (2013.01)

(58) Field of Classification Search
CPC .. H02K 1/14; H02K 1/20; H02K 3/24; H02K 3/47
(Continued)

(56) References Cited

U.S. PATENT DOCUMENTS 6,188,159 B1   2/2001  Fan
6,891,306 B1 *  5/2005  Soghomonian .......... H02K 1/27
                                                  310/266
(Continued)

FOREIGN PATENT DOCUMENTS

| CN | 107026518 A | 8/2017 |
| CN | 107528393 | 12/2017 |

(Continued)

OTHER PUBLICATIONS

Machine translation of EP1701427 Shim et al. (Year: 2006).*
(Continued)

*Primary Examiner* — Terrance L Kenerly
(74) *Attorney, Agent, or Firm* — BKRIP LLC

(57) ABSTRACT

Apparatus for use as a motor or generator, comprising: a first part; a second part movable relative to the first part and spaced from the first part by an air gap; and a plurality of spaced electromagnet elements (120) provided on the first part, each electromagnet element being operative to apply a magnetic field in the air gap in response to application of an electric current; wherein each electromagnet element comprises: a pole piece comprising: an outer section (124 A, 124B) defining an elongate air-gap facing surface (125 A) of area $A_1$, perimeter $P_1$, lateral width $W_1$, and longitudinal length $L_1$, wherein Li is greater than W1; and a coil-winding section of cross-sectional area $A_2$, cross-sectional perimeter $P_2$, lateral width $W_2$, and longitudinal length $L_2$; and an electrically conductive coil (128) wound around the coil-
(Continued)

winding section of the pole piece; characterised in that $P_2$ is less than $P_1$ and in that $W_2$ is substantially equal to $L_2$.

21 Claims, 6 Drawing Sheets

(58) Field of Classification Search
USPC .......................................................... 310/254
See application file for complete search history.

(56) References Cited

U.S. PATENT DOCUMENTS 8,922,087 B1* 12/2014 Rittenhouse ............ H02K 29/03
310/156.01

2003/0107289 A1* 6/2003 Thornton ............. H02K 41/031
310/254.1

FOREIGN PATENT DOCUMENTS

| DE | 102013201861 B3 | 7/2014 |
| EP | 1701427 | 9/2006 |
| GB | 2546255 | 7/2017 |
| WO | WO 2004/004092 | 1/2004 |
| WO | 2018089460 A1 | 5/2018 |

OTHER PUBLICATIONS

PCT Application No. PCT / EP2020 / 05992, International Search Report and Written Opinion mailed Aug. 17, 2020, 19 pp.
GB Patent Application GB1904941.0, Search Report mailed Feb. 26, 2020, 4 pp.

* cited by examiner

MOTOR/GENERATOR AND MOTOR DRIVE CIRCUIT

The present invention relates to apparatus for use as a motor or generator, and to a motor drive circuit (and corresponding method) for driving motor apparatus.

A huge variety of magnetic motor/generator designs are known in the art. Whilst the specific design may vary significantly from one application to another, the fundamental design is typically based around the use of one or more electromagnet elements formed by winding an electrically conductive wire around a non-permanently magnetisable pole piece to form a coil. The pole piece (which is usually iron-based) is operative to direct magnetic flux generated by an electrical current flowing through the coil to an air gap between moving and fixed parts of the motor (e.g. rotor and stator in the case of a rotary machine). The magnetic flux generated in the air gap is then attracted or repelled by magnets provided on the opposite side of the airgap.

Magnetic motor/generator designs in the art are generally assumed to operate on the basis of torque generation being a function of ampere turns and length of the wire coil in each electromagnet element. Thus, classical rotary motors are constructed either as a radial flux or as an axial flux design comprising a series of electromagnet units circumferentially spaced around a rotary axis of the motor. Examples of typical electromagnet units 10, 10' are shown in FIGS. 1A-B and FIGS. 1C-D respectively.

Each electromagnet unit 10, 10' comprises a pole piece 20, 20' having a longitudinally elongate cross-sectional profile and a corresponding elongate air-gap facing surface 22, 22' of length L, L'. Several layers of turns of an electrically conductive coil are wound around the pole piece 20, 20' to form a coil winding 30, 30'. The air-gap facing surface 22, 22' is elongate in the longitudinal direction in order to maximise the flux generated by each electromagnet unit.

Classical motor textbooks teach a relationship between the length of the electrically conductive wire and the flux generated in the air gap. The force developed is commonly defined as the number of turns of wire×the length of the turns of wire×the current flowing through the turns. Since the force developed is dependent upon the length of the turns of wire, the electromagnet elements of conventional motors are designed to place as many ampere turns of the longest length in the machine as possible.

The present applicant has identified an improved motor/generator design that provides an enhanced performance over the prior art.

In accordance with a first aspect of the present invention, there is provided apparatus for use as a motor or generator, comprising: a first part; a second part movable relative to the first part and spaced from the first part by an air gap; and a plurality of (e.g. laterally) spaced electromagnet elements provided on the first part, each electromagnet element being operative to apply (e.g. generate) a magnetic field in in the air gap in response to application of an electric current; wherein each electromagnet element comprises: a (e.g. non-permanently magnetisable) pole piece comprising: an outer section defining an elongate air-gap facing surface of area $A_1$, perimeter $P_1$, lateral width $W_1$, and longitudinal length $L_1$, wherein $L_1$ is greater than $W_1$; and a coil-winding section of cross-sectional area $A_2$, cross-sectional perimeter $P_2$, lateral width $W_2$, and longitudinal length $L_2$; and an electrically conductive coil wound around the coil-winding section of the pole piece; characterised in that $P_2$ is less than $P_1$ and in that $W_2$ is substantially equal to $L_2$.

In this way, motor/generator apparatus is provided in which the length of each turn of coil around the coil-winding section is reduced relative to a conventional design whilst maintaining a suitable level of magnetic flux generation within the pole piece. This is achieved by virtue of the fact that per unit area a shape with substantially equal longitudinal length and lateral width (e.g. a regular polygon or circle) will have a smaller perimeter than an elongate shape such as a rectangle. Advantageously, by reducing the length of coil for a given area of coil-winding section, heat loss through the coil, together with the mass and volume of the coil may all be reduced. The apparatus may be used in any application in which energy is converted between electrical energy and kinetic energy and vice versa including use as a motor, generator or sensor/detector transducer.

In one embodiment, $W_2 = L_2 +/-$ up to 10% (e.g. $W_2 = L_2 +/-$ up to 5%).

In one embodiment, $L_2 = W_2 +/-$ up to 10% (e.g. $L_2 = W_2 +/-$ up to 5%).

In one embodiment, $A_2 \geq A_1$. In this way, the full flux handling capacity of the outer section of the pole piece may be used and a maximum force effect per distance moved may be achieved.

In one embodiment, $A_1$ is substantially equal to $A_2$.

As used herein, the terms lateral width and longitudinal length mean the maximum lateral width and maximum longitudinal length of the sections. The lateral width is defined as the width in the direction of a path connecting the plurality of laterally spaced electromagnet elements and may be a circumferential path or a linear path depending upon the motor/generator geometry. The longitudinal length is defined as the maximum length in a direction perpendicular to the lateral width of the elongate air-gap facing surface.

In one embodiment, the coil-winding section has a substantially constant cross-sectional area $A_2$ along its length (e.g. a substantially constant cross-sectional profile along its length).

In one embodiment, cross-sectional area $A_2$ is an effective (e.g. mean) cross-sectional area of the coil-winding section.

In one embodiment, the outer section has a first saturation level $S_1$ (first magnetic saturation level) and the coil-winding section has a second saturation level $S_2$ (second magnetic saturation level).

Typically, $S_1 \geq S_2$ and $A_2 \geq A_1$.

However, in an alternative embodiment, $S_2$ is greater than $S_1$. In such an embodiment, $A_1$ may be greater than $A_2$. In this arrangement, the area of the coil-winding section $A_2$ may be reduced relative to $A_1$ over a range without any reduction in flux generated in the airgap.

Typically the second part supports a plurality of laterally spaced magnetic regions (e.g. plurality of laterally spaced permanent magnets). In one embodiment, the number of magnetic regions is either equal to or close to the number of electromagnet elements. In one embodiment, the number of magnetic regions differs from the number of electromagnet elements by +/−2, 3, 4, 6, 8, 9, 10 or 12.

In one embodiment, $P_2$ is less than or equal to 0.9 times $P_1$ (e.g. $P_2$ is less than or equal to 0.8 times $P_1$, e.g. $P_2$ is less than or equal to 0.7 times $P_1$, e.g. $P_2$ is less than or equal to 0.6 times $P_1$, e.g. $P_2$ is less than or equal to 0.5 times $P_1$).

In one embodiment, $W_2$ is greater than $W_1$ (e.g. $W_2 \geq 1.5 \times W_1$, e.g. $W_2 \geq 2 \times W_1$). In one embodiment, $W_2$ is substantially equal to $W_1$.

In one embodiment, $W_2$ is between 1 and 10 times $W_1$.

In one embodiment, the air-gap facing surface is substantially rectangular.

In one embodiment, the coil-winding section has a substantially square cross-sectional profile (i.e. $W_2=L_2$).

In one embodiment, the coil-winding section has a substantially circular cross-section (e.g. circular or near-circular elliptical or substantially circular polygonal cross-section) of diameter D (i.e. $W_2=L_2=D$). In one embodiment, D is greater than $W_1$. Advantageously, a substantially circular cross-section provides for an increase in reliability since a circular coil winding reduces the risk of stress points/points of weakness being formed on the coil and thereby reduces the risk of consequential hot spots and reduces the risk of stress/friction induced fatigue.

In a first series of embodiments, the first part is rotatable relative to the second part about a rotary axis. In this way, the apparatus may be configured to convert between electrical energy and rotary motion (hereinafter "rotary machine"), such as a rotary motor or rotary input generator.

In one embodiment, the plurality of electromagnet elements are spaced circumferentially relative to the rotary axis.

In one embodiment, the apparatus is an axial flux device and the air-gap facing surface extends radially relative to the rotary axis.

In one embodiment, the apparatus is a radial flux device and the air-gap facing surface extending axially relative to the rotary axis.

In a second series of embodiments, the first part is operative to move relative to the second part along a linear axis. In this way, the apparatus may be configured to convert between electrical energy and linear motion (hereinafter "linear machine"), such as a linear motor or linear input generator.

In one embodiment, the plurality of electromagnet elements are axially spaced relative to the linear axis.

In one embodiment, the first part is a movable (e.g. rotor) part and the second part is a stator part.

In one embodiment, the first part is a stator part and the second part is a movable (e.g. rotor) part.

In the case of a rotary machine, the moveable part of the apparatus (rotor) may have a substantially annular profile.

In one embodiment, the coil-winding sections of adjacent electromagnet elements are longitudinally offset to allow the air-gap facing surfaces of adjacent electromagnet elements to be positioned in close proximity (e.g. with the coil-winding sections of adjacent electromagnet elements being fully longitudinally offset and partially laterally overlapping). For example, in one embodiment, a first set of electromagnet elements have the coil-winding section at a first longitudinal end thereof and a second set of electromagnet elements have the coil-winding section at a second longitudinal end thereof. In this way, the impact of a width $W_2$ substantially greater than $W_1$ on pole piece spacing may be largely offset by the selection of $L_1$ substantially greater than $L_2$ allowing construction of a motor/generator with maximum force effect per distance moved. Typically the large size of $A_2$ required will limit the number of longitudinally offset sets of electromagnet elements to a maximum of two sets (i.e. upper half and lower half sets only).

Typically the coil-winding section of the pole piece defines a winding axis extending perpendicular to the air-gap facing surface. For example, in the case of a coil-winding section with a substantially circular cross-section the winding axis will correspond to a central axis of the substantially circular cross-section.

In one embodiment, the cross-section of the coil-winding section is configured to form a substantially circular winding profile (e.g. circular cross-section or substantially circular polygonal profile).

In one embodiment, the pole piece comprises a further outer section defining a further elongate air-gap facing surface as previously defined, the further outer section is provided at an opposed end of the pole piece to the first-defined outer section. In one embodiment the further elongate air-gap facing surface is opposed to the first defined elongate air-gap facing surface. In this way, a double-sided ("yokeless") arrangement is provided that provides highly efficient motor/generator performance whilst avoiding the need for a back iron acting as a magnetic return path (as would be required in a single-sided arrangement).

In one embodiment, the second part comprises a first section facing the first-defined outer section and a second section facing the further outer section (e.g. dual rotor magnet arrangement). Typically the first section support a first plurality of laterally spaced magnetic regions and the second section supports a second plurality of laterally spaced magnetic regions.

In one embodiment, the outer section and/or further outer section has a tapered axial profile. In one embodiment, tapered axial profile decreases in thickness in the direction of the winding axis with increased longitudinal distance from the coil-winding section. In this way, the outer section(s) of the pole piece need be no larger or heavier than is necessary to transmit the required flux across the full length of the air-gap facing surface.

In one embodiment, the outer section and/or further outer section has a maximum thickness in the direction of the winding axis configured to ensure adequate separation between the coil and the air gap in order to screen the coil from eddy currents induced by the magnetic field in the air gap.

In one embodiment, the apparatus further comprises a current control circuit operative to control a current supply to the electrically conductive coil.

In one embodiment, the electrically conductive coil is wound around the coil-winding section with fewer than 5 layers of turns (e.g. 1 or 2 layers of turns).

In one embodiment, the electrically conductive coil of each electromagnet element is fluid-cooled by direct contact with fluid flowing over the electrically conductive coil.

In one embodiment, the electrically conductive coil of each electromagnet element is directly connected to a locally mounted control circuit that controls the level and timing of current flowing through the electrically conductive coil.

In one embodiment, the each locally mounted control circuit senses the relative position of the first part relative to the second part and is operative to (e.g. independently) determine the optimum timing and magnitude of current to be delivered to the electrically conductive coil(s) under its control.

In one embodiment, each locally mounted control circuit is equipped with dual communication channels for the purpose of: a) receiving force (e.g. torque) and/or speed demand information; and b) for communicating its status to a remote control system.

In one embodiment, each locally mounted control circuit receives electrical power from two independent power sources.

In one embodiment, wherein the power from the two independent sources is delivered to alternate control circuits.

In one embodiment, the plurality of electromagnet elements are divided into a plurality of phase groups, wherein each phase group receives current (e.g. from the locally mounted control circuit) at a different time to the other phase groups.

In one embodiment, the apparatus is an electrical vehicle motor (e.g. electrical vehicle propulsion motor), an electric aircraft motor (e.g. electric aircraft propulsion motor) or an electric watercraft motor (e.g. electric water craft propulsion motor).

In accordance with a second aspect of the present invention, there is provided apparatus for use as a motor or generator, comprising: a first part; a second part movable relative to the first part and spaced from the first part by an air gap; and a plurality of (e.g. laterally) spaced electromagnet elements provided on the first part, each electromagnet element being operative to apply (e.g. generate) a magnetic field in in the air gap in response to application of an electric current; wherein each electromagnet element comprises: a (e.g. non-permanently magnetisable) pole piece comprising: an outer section defining an elongate air-gap facing surface of area $A_1$, perimeter $P_1$, lateral width $W_1$, and longitudinal length $L_1$, wherein $L_1$ is greater than $W_1$; and a coil-winding section of cross-sectional area $A_2$ and cross-sectional perimeter $P_2$; and an electrically conductive coil wound around the coil-winding section of the pole piece; characterised in that the coil-winding section has a substantially circular cross-section of diameter D.

In this way, motor/generator apparatus is provided with a coil-winding section configured to form a substantially circular winding profile. Advantageously, a circular winding profile provides for an increase in reliability since a circular coil winding reduces the risk of stress points/points of weakness being formed on the coil and thereby reduces the risk of consequential hot spots and reduces the risk of stress/friction induced fatigue due to repeated expansion and contraction of the coil. The apparatus may be used in any application in which energy is converted between electrical energy and kinetic energy and vice versa including use as a motor, generator or sensor/detector transducer.

In one embodiment, $P_2$ is less than $P_1$. In this way, the length of wire may be minimised as discussed above.

In one embodiment, $A_2 \geq A_1$.

In one embodiment, $A_1$ is substantially equal to $A_2$.

As used herein, the terms lateral width and longitudinal length mean the maximum lateral width and maximum longitudinal length of the sections. The lateral width is defined as the width in the direction of a path connecting the plurality of laterally spaced electromagnet elements and may be a circumferential path or a linear path depending upon the motor/generator geometry. The longitudinal length is defined as the maximum length in a direction perpendicular to the lateral width of the elongate air-gap facing surface.

In one embodiment, the coil-winding section has a substantially constant cross-sectional area $A_2$ along its length (e.g. a substantially constant cross-sectional profile along its length).

In one embodiment, cross-sectional area $A_2$ is an effective (e.g. mean) cross-sectional area of the coil-winding section.

In one embodiment, the outer section has a first saturation level $S_1$ (first magnetic saturation level) and the coil-winding section has a second saturation level $S_2$ (second magnetic saturation level).

Typically, $S_1 \geq S_2$ and $A_2 \geq A_1$.

However, in an alternative embodiment, $S_2$ is greater than $S_1$. In such an embodiment, $A_1$ may be greater than $A_2$. In this arrangement, the area of the coil-winding section $A_2$ may be reduced relative to $A_1$ over a range without any reduction in flux generated in the airgap.

Typically the second part supports a plurality of laterally spaced magnetic regions (e.g. plurality of laterally spaced permanent magnets). In one embodiment, the number of magnetic regions is either equal to or close to the number of electromagnet elements. In one embodiment, the number of magnetic regions differs from the number of electromagnet elements by +/−2, 3, 4, 6, 8, 9, 10 or 12.

In one embodiment, $P_2$ is less than or equal to 0.9 times $P_1$ (e.g. $P_2$ is less than or equal to 0.8 times $P_1$, e.g. $P_2$ is less than or equal to 0.7 times $P_1$, e.g. $P_2$ is less than or equal to 0.6 times $P_1$, e.g. $P_2$ is less than or equal to 0.5 times $P_1$).

In one embodiment, D is substantially equal to $W_1$.

In one embodiment, D is greater than $W_1$ (e.g. $D \geq 1.5 \times W_1$, e.g. $D \geq 2 \times W_1$).

In one embodiment, D is between 1 and 10 times $W_1$.

In one embodiment, the air-gap facing surface is substantially rectangular.

In a first series of embodiments, the first part is rotatable relative to the second part about a rotary axis. In this way, the apparatus may be configured to convert between electrical energy and rotary motion (hereinafter "rotary machine"), such as a rotary motor or rotary input generator.

In one embodiment, the plurality of electromagnet elements are spaced circumferentially relative to the rotary axis.

In one embodiment, the apparatus is an axial flux device and the air-gap facing surface extends radially relative to the rotary axis.

In one embodiment, the apparatus is a radial flux device and the air-gap facing surface extending axially relative to the rotary axis.

In a second series of embodiments, the first part is operative to move relative to the second part along a linear axis. In this way, the apparatus may be configured to convert between electrical energy and linear motion (hereinafter "linear machine"), such as a linear motor or linear input generator.

In one embodiment, the plurality of electromagnet elements are axially spaced relative to the linear axis.

In one embodiment, the first part is a movable (e.g. rotor) part and the second part is a stator part.

In one embodiment, the first part is a stator part and the second part is a movable (e.g. rotor) part.

In the case of a rotary machine, the moveable part of the apparatus (rotor) may have a substantially annular profile.

In one embodiment, the coil-winding sections of adjacent electromagnet elements are longitudinally offset to allow the air-gap facing surfaces of adjacent electromagnet elements to be positioned in close proximity (e.g. with the coil-winding sections of adjacent electromagnet elements being fully longitudinally offset and partially laterally overlapping). For example, in one embodiment, a first set of electromagnet elements have the coil-winding section at a first longitudinal end thereof and a second set of electromagnet elements have the coil-winding section at a second longitudinal end thereof.

Typically the coil-winding section of the pole piece defines a winding axis extending perpendicular to air-gap facing surface. For example, in the case of a coil-winding section with a substantially circular cross-section the winding axis will correspond to a central axis of the substantially circular cross-section.

In one embodiment, the pole piece comprises a further outer section defining a further elongate air-gap facing surface as previously defined, the further outer section is provided at an opposed end of the pole piece to the first-defined outer section. In one embodiment the further elongate air-gap facing surface is opposed to the first defined elongate air-gap facing surface. In this way, a double-sided arrangement is provided that provides highly efficient motor/generator performance whilst avoiding the need for a back iron acting as a magnetic return path (as would be required in a single-sided arrangement).

In one embodiment, the second part comprises a first section facing the first-defined outer section and a second section facing the further outer section (e.g. dual rotor magnet arrangement). Typically the first section support a first plurality of laterally spaced magnetic regions and the second section supports a second plurality of laterally spaced magnetic regions.

In one embodiment, the outer section and/or further outer section has a tapered axial profile. In one embodiment, tapered axial profile decreases in thickness in the direction of the winding axis with increased longitudinal distance from the coil-winding section.

In one embodiment, the apparatus further comprises a current control circuit operative to control a current supply to the electrically conductive coil.

In one embodiment, the electrically conductive coil is wound around the coil-winding section with fewer than 5 layers of turns (e.g. 1 or 2 layers of turns).

In one embodiment, the electrically conductive coil of each electromagnet element is fluid-cooled by direct contact with fluid flowing over the electrically conductive coil.

In one embodiment, the electrically conductive coil of each electromagnet element is directly connected to a locally mounted control circuit that controls the level and timing of current flowing through the electrically conductive coil.

In one embodiment, the each locally mounted control circuit senses the relative position of the first part relative to the second part and is operative to (e.g. independently) determine the optimum timing and magnitude of current to be delivered to the electrically conductive coil(s) under its control.

In one embodiment, each locally mounted control circuit is equipped with dual communication channels for the purpose of: a) receiving force (e.g. torque) and/or speed demand information; and b) for communicating its status to a remote control system.

In one embodiment, each locally mounted control circuit receives electrical power from two independent power sources.

In one embodiment, wherein the power from the two independent sources is delivered to alternate control circuits.

In one embodiment, the plurality of electromagnet elements are divided into a plurality of phase groups, wherein each phase group receives current (e.g. from the locally mounted control circuit) at a different time to the other phase groups.

In one embodiment, the apparatus is an electrical vehicle motor (e.g. electrical vehicle propulsion motor), an electric aircraft motor (e.g. electric aircraft propulsion motor) or an electric watercraft motor (e.g. electric water craft propulsion motor).

In accordance with a third aspect of the present invention, there is provided a motor drive circuit comprising: first and second DC series-connected power sources; a positive supply rail connected to a positive side of the first power source, a negative supply rail connected to the negative side of the second power source, and a common rail connected between the first and second power sources; a plurality of phase circuits, each phase circuit comprising: a first switch and a second switch connected in series between the positive supply rail and the negative supply rail; and a phase element of a motor connected to an intermediate point between the switches and to the common rail; and control circuitry configured operate in cycles to apply signals that cause the first and second switches to open or close, wherein: in a fully-functional mode, during each cycle the first switch is closed and subsequently opened and the second switch is then closed and subsequently opened; and in a partially-functional mode, during each cycle one of the first switch or the second switch is then closed and subsequently opened and the other of the first switch or the second switch remains open.

In this way, a motor drive circuit is provided which, in the fully-functional mode, during each cycle, the motor drive circuit causes current to flow through the phase element and first in one direction then in the opposite direction causing the a motor connected to the drive circuit to be driven in a full cycle using alternating power sources. In the event that one of the switches or power sources fails, then the motor can still be driven in a half cycle in a partially-function mode (e.g. degraded mode), with current being delivered for half the time of a cycle in just one direction. This means that the motor will operate with reduced power and with uneven torque, but drive will not be lost.

In one embodiment, the phase element is a phase coil of a magnetic motor.

In typical embodiments, the plurality of phase circuits comprises two or more phase circuits (e.g. three or more phase circuits).

In accordance with a fourth aspect of the present invention, there is provided a motor system comprising: a motor; and a motor drive circuit in accordance with the second aspect of the present invention.

In one embodiment, the motor is a magnetic motor.

In one embodiment, the motor is an electrical vehicle motor (e.g. electrical vehicle propulsion motor), an electric aircraft motor (e.g. electric aircraft propulsion motor) or an electric watercraft motor (e.g. electric water craft propulsion motor).

In one embodiment, the motor is a motor in accordance with the first or second aspect of the present invention.

In accordance with a fifth aspect of the present invention, there is provided a method of operating a drive circuit to apply drive current to a motor by applying, in cycles, a drive current to a phase element of the motor, wherein: in a fully-functional mode, in each cycle, a phase circuit of the drive circuit: closes a first switch to connect the phase element to a first power supply to cause a current to flow in the phase element in a first direction; opens the first switch; then closes a second switch to connect the phase element to a second power supply to cause a current to flow in the phase element in a second direction; and in a partially-functional mode, in each cycle, a phase circuit of the drive circuit: closes a first switch to connect the phase element to a first power supply to cause a current to flow in the phase element in a first direction; and opens the first switch; and maintains the second switch open until completion of the cycle, whereby no current is provided to the phase element in the second direction.

The drive circuit typically includes a plurality of phase circuits, each operating in a respective cycle displaced in time with respect to the cycles of the other phase circuits. In such embodiments, each of the phase circuits may operate in the fully-functional mode or the partially-functional mode independently of the other phase circuits.

In one embodiment, the phase element is a phase coil of a magnetic motor.

In one embodiment, the motor is an electrical vehicle motor (e.g. electrical vehicle propulsion motor), an electric aircraft motor (e.g. electric aircraft propulsion motor) or an electric watercraft motor (e.g. electric water craft propulsion motor).

In one embodiment, the motor is a motor in accordance with the first aspect of the present invention.

Embodiments of the present invention will now be described by way of example with reference to the accompanying drawings in which.

Figure 1A:
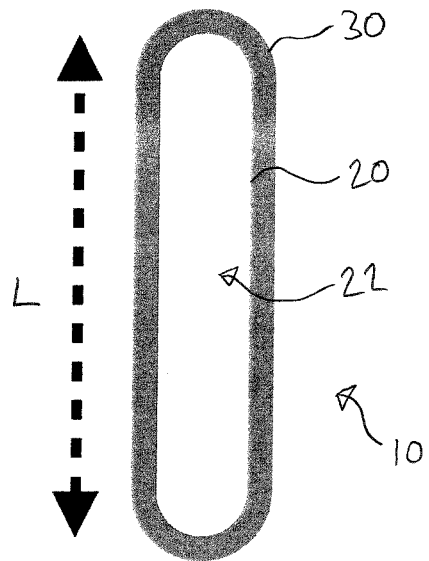
FIG. 1A illustrates a schematic end view of a first electromagnet element design in accordance with the prior art.
Figure 1C:
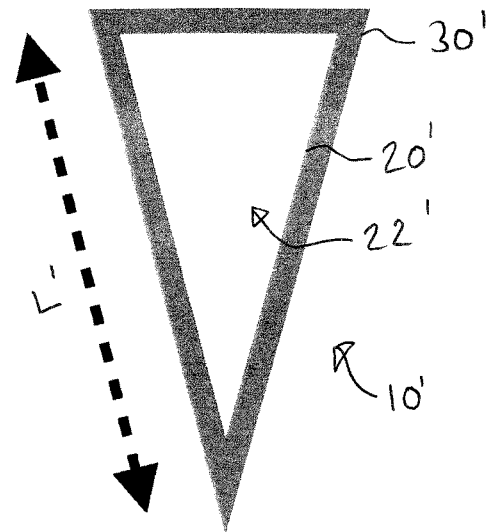
FIG. 1C illustrates a schematic end view of a second electromagnet element design in accordance with the prior art.
Figure 1B:
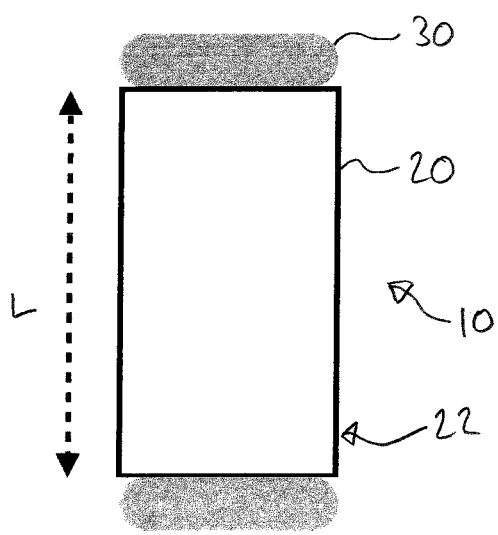
FIG. 1B illustrates a schematic cross-sectional side view of the electromagnet element of FIG. 1A.
Figure 1D:
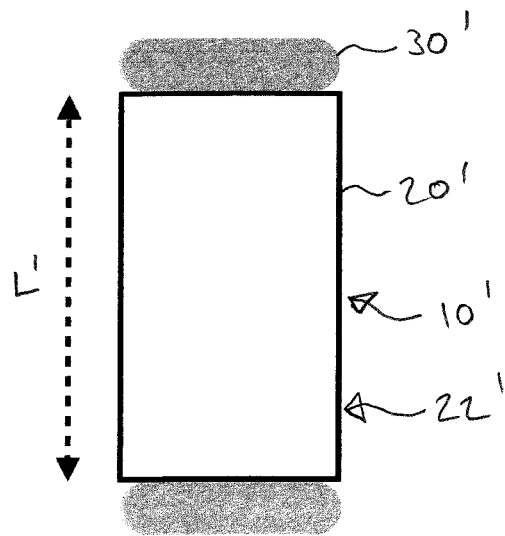
FIG. 1D illustrates a schematic cross-sectional side view of the electromagnet element of FIG. 1C.
Figure 2A:
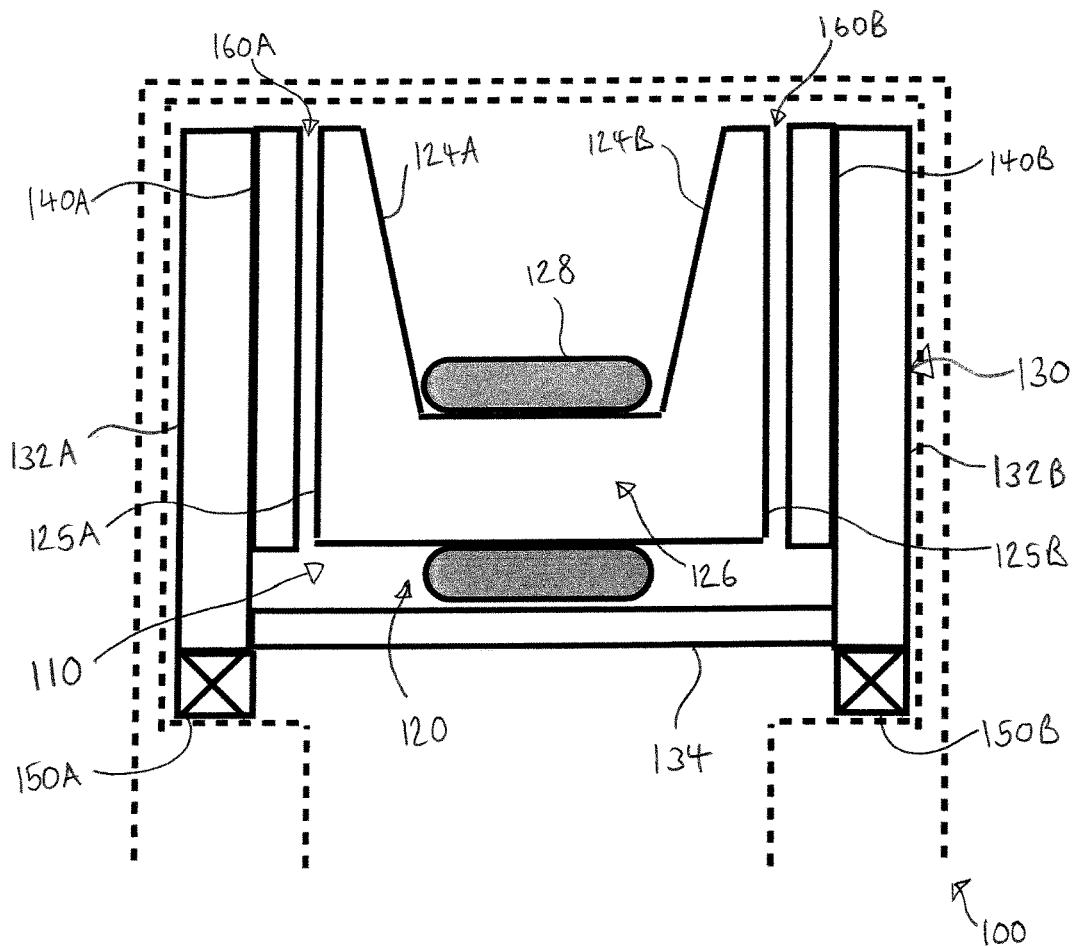
FIG. 2A is a schematic cross-sectional side view of an axial flux motor/generator in accordance with a first embodiment of the present invention.
Figure 2B:
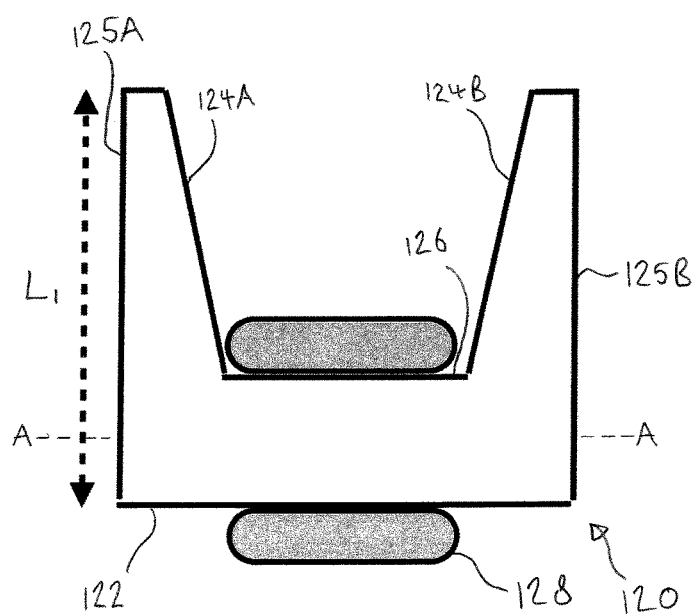
FIG. 2B is a schematic cross-sectional side view of an electromagnet element of an array of electromagnet elements forming part of the motor/generator of FIG. 2A.
Figure 2C:
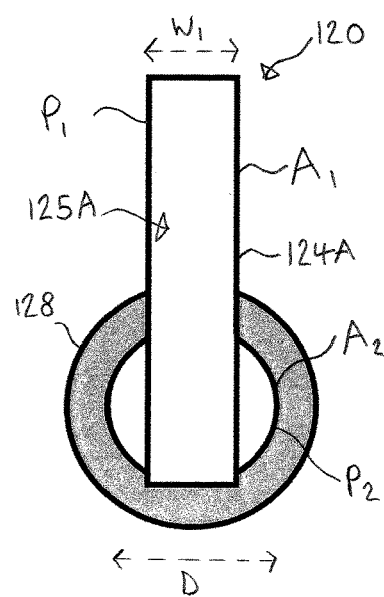
FIG. 2C is a schematic end view of the electromagnet element of FIG. 2B.
Figure 2D:
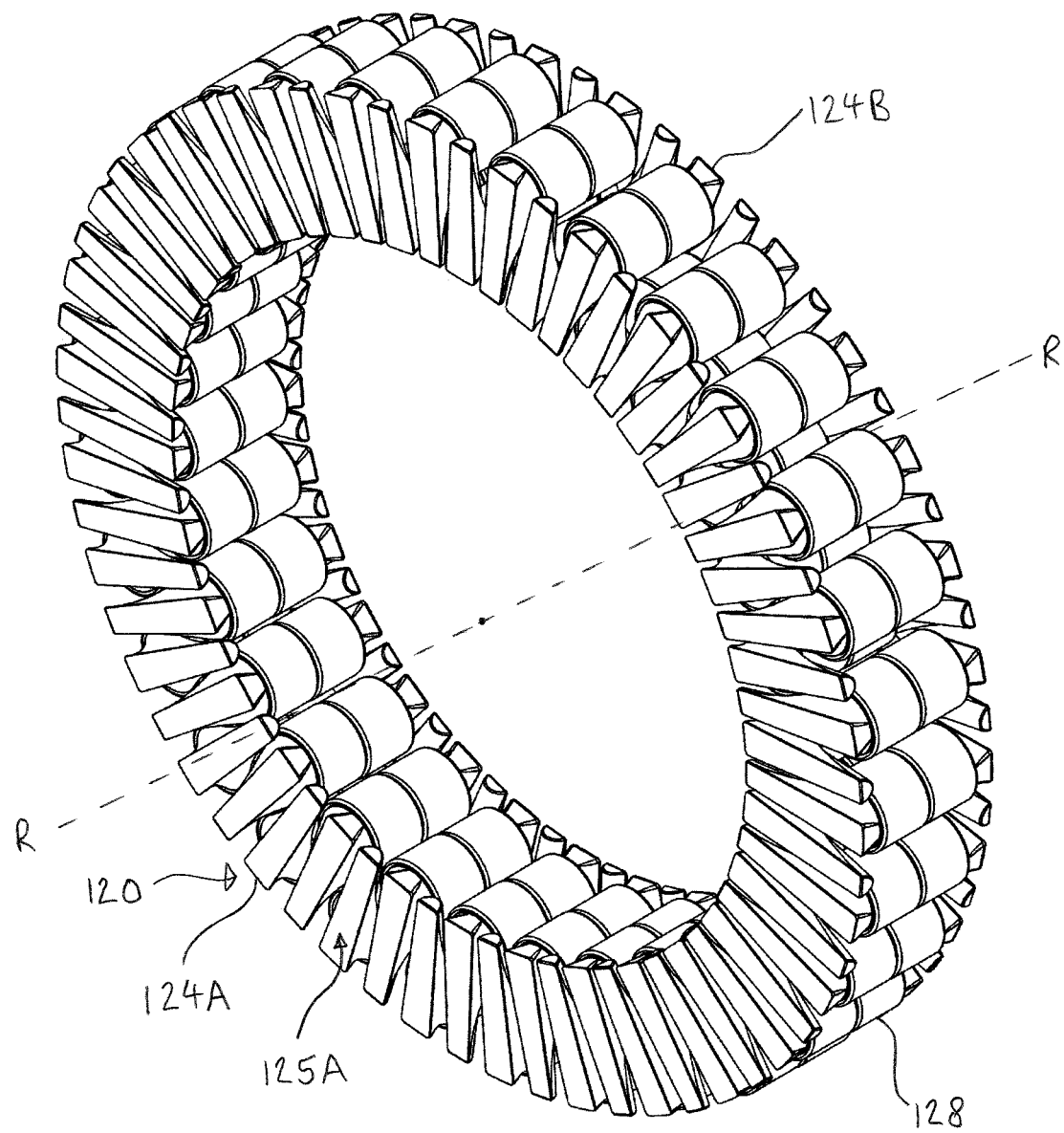
FIG. 2D is a schematic perspective view of an array of electromagnet elements forming part of the motor/generator of FIG. 2A.

FIG. 2A illustrates an axial flux rotary motor/generator apparatus 100 comprising a stator 110 and a rotor 130 arranged to rotate about a rotary axis "R".

Stator 110 comprises an annular array of n circumferentially spaced electromagnet elements 120. Rotor 130 comprises first and second arrays of p circumferentially spaced permanent magnets 140A, 140B (wherein typically n=p+/−2, 3, 4, 6, 8, 9, 10 or 12) mounted on first and second annular back iron plates 132A, 132B connected by an inner annular connecting tube 134. Rotor 130 is configured to rotate relative to stator 110 about a rotary axis via bearings 150A, 150B and is spaced the stator 110 by "active" air gaps 160A, 160B extending axially relative to the rotary axis "R".

Each electromagnet element 120 is operative to generate a magnetic field in response to application of an electric current and comprises a non-permanently magnetisable pole piece 122 comprising: a pair of axially opposed outer sections 124A, 124B each defining an elongate substantially rectangular air-gap facing surfaces 125A, 125B extends radially relative to the rotary axis; a central coil-winding section 126 defining a winding axis "A" extending perpendicular to air-gap facing surfaces 125A, 125B; and an electrically conductive coil 128 wound around the coil-winding section 126 of pole piece 122 to form a substantially circular winding profile. Typically the electrically conductive coil is wound around the coil-winding section with fewer than 5 layers of turns (e.g. 1 or 2 layers of turns).

Outer sections 124A, 124B each have an area $A_1$, perimeter $P_1$, lateral width $W_1$, and longitudinal length $L_1$, wherein $L_1$ is greater than $W_1$. In contrast, coil-winding section 126 has a substantially circular cross-section of area $A_2$, cross-sectional perimeter/circumference $P_2$, and diameter D (corresponding to a maximum lateral width $W_2$ and a maximum longitudinal length $L_2$), wherein D is greater than $W_1$, and $P_2$ is less than $P_1$. In this example, $P_2$ is less than or equal to 0.5 times $P_1$.

Pole piece 122 may be formed by high pressure/temperature sintering of one or more powered iron-based material.

In one embodiment, outer sections 124A, 124B and coil-winding section 126 are formed from materials with substantially equal magnetic saturation level (e.g. the same material) and hence D is selected such that $A_1=A_2$. In this way, the reduced perimeter $P_2$ of the coil-winding section relative to the perimeter $P_1$ of the air-gap facing surface should not diminish the flux generated by the electromagnet in the air gap.

In another embodiment, outer sections 124A, 124B have a first saturation level $S_1$ and coil-winding section 126 has a second saturation level $S_2$, wherein $S_2$ is greater than $S_1$. For example, cobalt steel has a saturation level of around 2.5 Tesla compared to silicon steel that has a saturation level of around 1.8 Tesla. In this situation, $A_1$ may be greater than $A_2$ allowing the area of the coil-winding section $A_2$ to be reduced relative to $A_1$ over a range of values (with the range being dependent upon the relative values of $S_2$ and $S_1$) without any reduction in flux generated in the airgap.

Figure 2E:
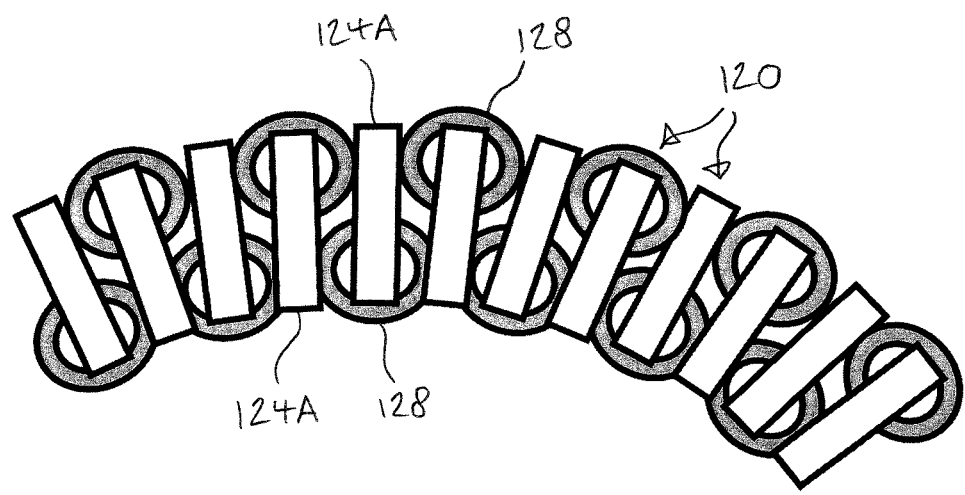
FIG. 2E is a schematic end view of part of the array of electromagnet element of FIG. 2D.

As illustrated in FIG. 2E, the coil-winding sections 126 of adjacent electromagnet elements 120 are longitudinally offset to allow the air-gap facing surfaces of adjacent electromagnet elements to be positioned in close proximity. This is achieved in this example by arranging the electromagnet elements in alternating longitudinal orientations such that the coil-winding sections alternate in position between a radially outermost position and a radially innermost position. In this way, the coil-winding sections 126 of adjacent electromagnet elements 126 are fully longitudinally offset and partially laterally overlapping.

Figure 2F:
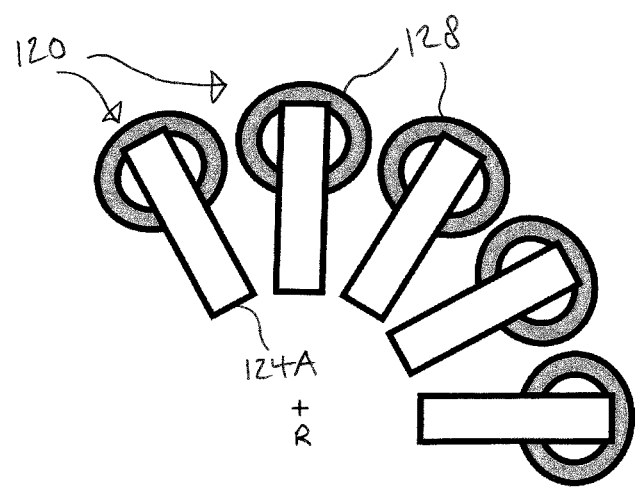
FIG. 2F is a schematic end view of part of an alternative array of electromagnet elements in accordance with a second embodiment of the present invention.

FIG. 2F shows an alternative arrangement suitable for a smaller diameter rotary machine in which the coil-winding sections 126 of adjacent electromagnet elements 120 are positioned so that they are longitudinally aligned.

Outer sections 124A, 124B each have a tapered axial profile, whereby the outer section decreases in thickness in the direction of the winding axis "A" with increased longitudinal distance from the coil-winding section 126.

Advantageously, the geometry of electromagnet elements 120 results in an arrangement in which the length of each turn of coil around the coil-winding section 126 is reduced relative to a conventional design whilst maintaining a suitable level of magnetic flux generation within pole piece 122. This is achieved by virtue of the fact that per unit area a shape with substantially equal longitudinal length and lateral width, in this example a circle, will have a smaller perimeter than the elongate rectangular shape of the air-gap facing surfaces 125A, 125B. Advantageously, by reducing the length of coil for a given area of coil-winding section, heat loss through the coil (which is dependent upon wire length) may be reduced, together with the mass and volume of the coil.

In addition, the geometry of the electromagnet elements 120 also allows electrically conductive coils 128 to be fluid-cooled (e.g. air-cooled) by direct contact with fluid flowing over the coils. In one embodiment, the apparatus is configured to provide a cooling fluid flow path that enters from an inner diameter and exits from an outer diameter so as to create a highly turbulent flow characteristic over the coil surfaces. The fact that each coil is longitudinally displaced from its neighbours enables fluid flow between neighbouring coils. As the form of the coils is circular, the area presented in close proximity by each coil to its neighbour is locally small thus the risk of inter coil electrical breakdown may be significantly reduced compared to conventional machines. Since each coil may be fully exposed to coolant this arrangement allows maximum area of contact for heat extraction.

In one embodiment, the electrically conductive coil 128 of each electromagnet element 120 is directly connected to a locally mounted control circuit (not shown) that governs the size of current and timing of current flowing through the electrically conductive coil.

In use, the plurality of electromagnet elements 120 are divided into a plurality of phase groups, wherein each phase group receives current (e.g. from a locally mounted control circuit) at a different time to the other phase groups.

By utilising a circular form of coil and moving the coil out of the immediate active air gap area the arrangement of the present invention is able to gain a significant reduction in heat and hence improvement in efficiency and power and force/torque density.

Advantageously, the use of the substantially circular coil ensures an even stress on the wire thereby avoiding issues associated with a non-circular form, such as a rectangular forms, where the corners impose a significant local stress on the wire during winding. This stress results in a local thinning of the copper section and thus an increased local resistance and risk of hot spots. Given that during its working life a motor winding is likely to be driven through a huge number of expansion/contraction cycles as the wire heats and subsequently cools after activation, stress/friction fatigue is a major issue. Accordingly, a circular winding is expected to significantly reduce the risk of failure due to fatigue. Additionally, the local stress stretches the insulation on the outer surface of the wire such that insulation breakdown is more likely as a result. The use of a circular coil also means that the coil can be easily wound using high speed winding machines to achieve very low build cost.

Risk of damage to coils is also low since unlike laminated systems that have sharp edges requiring robust lining material between coil and lamination stack. This significantly reduces heat extraction ability as robust lining material is a significant thermal insulator.

The reduction in coil length (and hence heat generated by the coil), together with a significant increase in accessible direct coil cooling area, deliberate flow path designed to cause turbulence over the coil surface, the high packing density resulting from an inner set of coils and an outer set of coils, give the machine design of FIG. 2A the potential to be a very high performing, very high reliability design.

Figure 3:
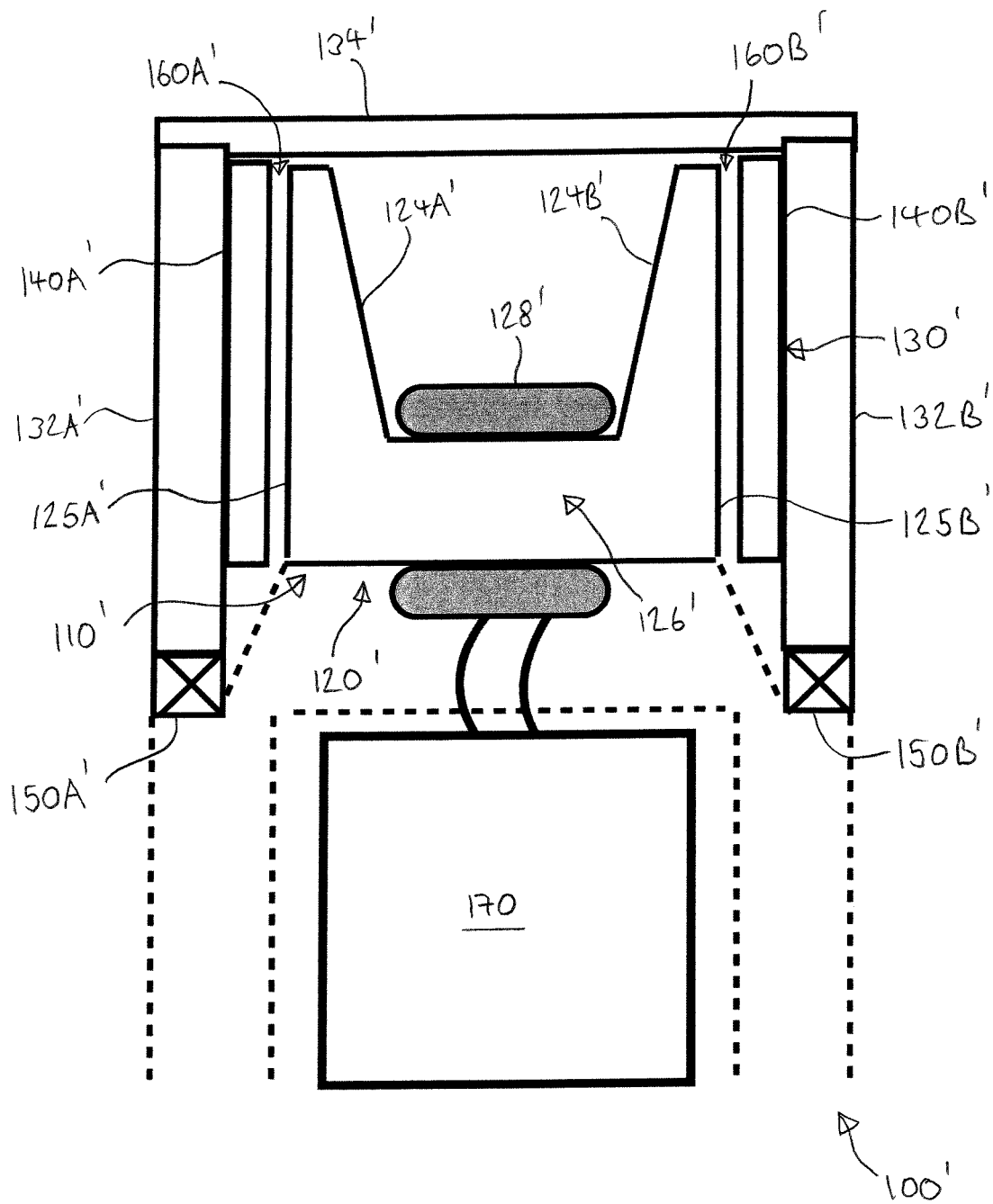
FIG. 3 is a schematic cross-sectional side view of an axial flux motor/generator in accordance with a further embodiment of the present invention.

FIG. 3 shows an axial flux rotary motor/generator apparatus 100' based on the axial flux rotary motor/generator apparatus 100 of FIG. 2A (features in common are labelled accordingly for ease of reference). Motor/generator apparatus 100' differs from motor/generator apparatus 100 by virtue of rotor 130' having a radially outer rather than inner annular connecting tube 134' permitting easier placement of locally mounted control circuits 170 and simple electrical connection between each locally mounted control circuit 170 and its respective electromagnet element 120'.

In one embodiment, each locally mounted control circuit 170 senses the relative position of the first part relative to the second part and is operative to (e.g. independently) determine the optimum timing and magnitude of current to be delivered to the electrically conductive coil(s) under its control.

In one embodiment, each locally mounted control circuit 170 is equipped with dual communication channels for the purpose of: a) receiving force (e.g. torque) and/or speed demand information; and b) for communicating its status to a remote control system.

In one embodiment, each locally mounted control circuit 170 receives electrical power from two independent power sources. In one embodiment, wherein the power from the two independent sources is delivered to alternate control circuits.

Figure 4:
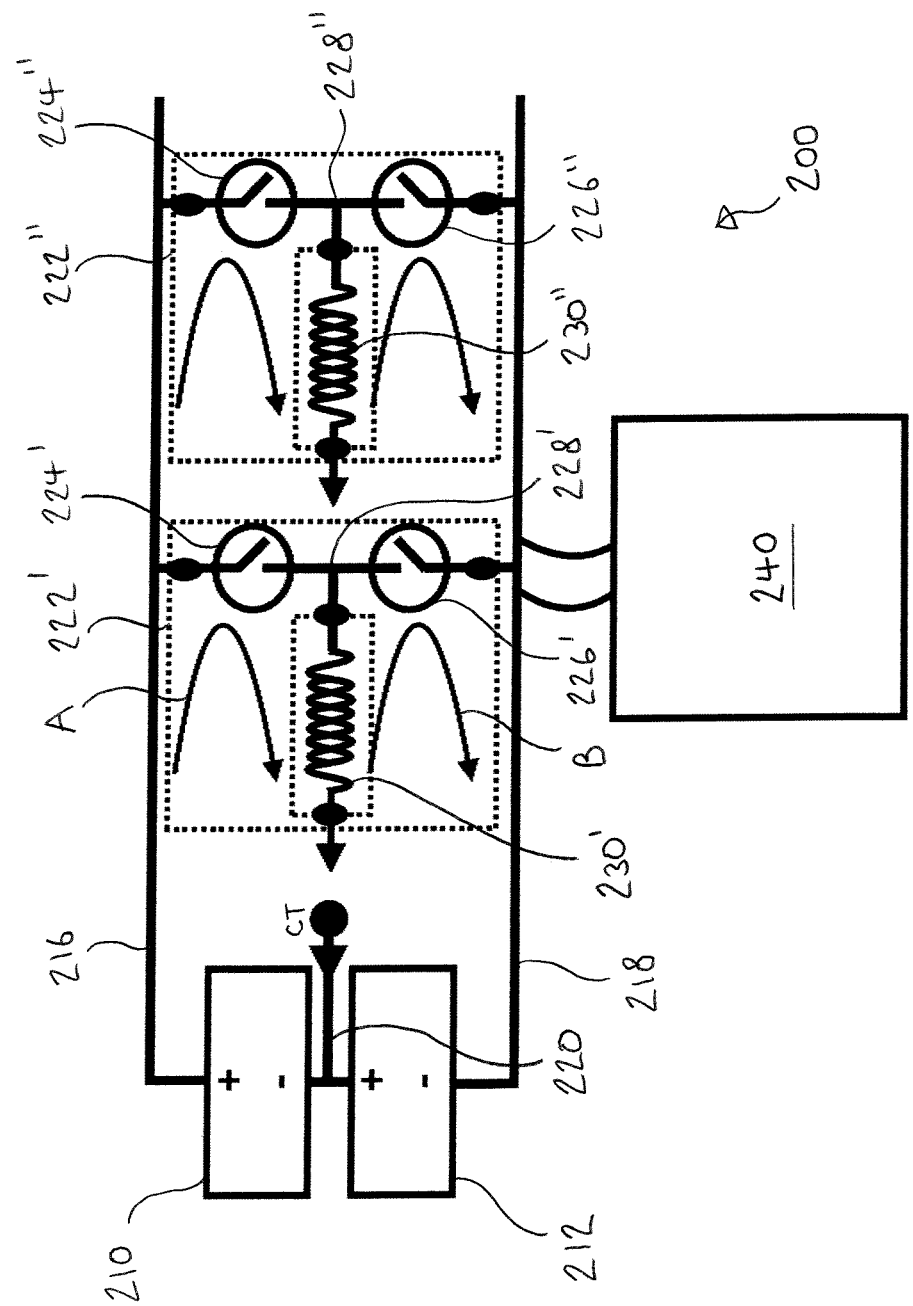
FIG. 4 is a schematic illustration of a motor drive circuit in accordance with another embodiment of the present invention.

FIG. 4 shows a motor drive circuit 200 for use in driving apparatus 100, 100' when operational as a motor. Motor drive circuit 200 comprises a first DC power supply 210 and a second DC power supply 212. The first and the second DC power supplies 210, 212 are connected in series. A positive output of the first power supply 210 is connected to a positive supply rail 216 and a negative output of the second power supply 212 is connected to a negative supply rail 218. A common supply rail 220 is connected to a point between the first and the second power supplies 210, 212.

The drive circuit includes a plurality of phase circuits, two of which 222', 222" are shown in the drawing. Each drive circuit comprises a first switch 224', 224" and a second switch 226', 226". In this example, the switches are solid state switches controlled by a control input that is not shown in the diagram. A signal can be applied to the control input of each switch 224', 224"; 226', 226" independently from the others to selectively cause the switch to close, thereby creating a conductive path between power terminals of the switch or to open thereby isolating power terminals of the switch from one another. Within each phase circuit, the switches 224, 226 are connected in series, the first switch 224', 224" having a power terminal connected to the positive supply rail 216 and the second switch having a power terminal connected to the negative supply rail 218. The power terminals that are not connected to a supply rail 216, 218 are interconnected at a common point 228.

Each drive circuit is disposed to supply power to a respective phase coil 230', 230" of a motor (not shown). Each phase coil 230', 230" is connected between the common point 228 of one of the phase circuits 222', 222" and the common supply rail 220.

A control system 240 is configured to apply input signals to the control input of the switches to cause the switches to close or open. Control system 240 operates in cycles, with the cycle of signals applied to one phase circuit 222' leading or lagging the cycles applied to each other phase circuit 222" by an amount determined by the configuration of the motor being driven.

In normal operation, each cycle is assumed to start with both switches 224', 226' open. The first switch 224' is closed, causing current from the first power supply 210 to flow in the phase coil 230' in a first direction (arrow A). As the motor rotates, the relative positions of its coils and pole pieces change until such time as the current in the phase coil 230' has to be reversed if the motor is to continue to produce an output torque. At this moment, the first switch 224' is opened and the second switch 226' is closed, causing current from the second supply 212 to flow in the phase coil 230' in the opposite direction (arrow B). Note that the first and second switches 224', 226' must never be closed simultaneously because this would cause the power supplies 210, 212 to be short-circuited.

In the event that either one of the power supplies 210, 212 or a switch 224', 226' fails, the part of the operating cycle in which the failed component is not involved will continue to supply power to the phase coil 230' in one direction only and during only half of the cycle. While this results in degraded performance, it ensures that the motor is still powered so drive is not lost altogether. Advantageously, the motor drive circuit 200 of the present invention provides a viable alternative to the classical "H" bridge of 4 switches that requires a large number of switches and is dependent upon a single point supply.

Apparatus 100, 100' and motor drive circuit 200 may be used in a variety of applications including but not limited to high power, high reliability applications such as electric vehicle propulsion motors, electric aircraft propulsion motors and electric watercraft propulsion motors. The use of a low fatigue electric motor 100, 100' and the failsafe motor drive circuit 200 may be particularly suited to electric aircraft motor applications (e.g. used to drive a propeller or lift-generating rotor of an electric aircraft) where reliability is of utmost importance.

The invention claimed is:

1. Apparatus for use as a motor or generator, comprising:
a first part;
a second part movable relative to the first part and spaced from the first part by an air gap; and
a plurality of laterally spaced electromagnet elements provided on the first part, each electromagnet element being operative to apply a magnetic field in the air gap in response to application of an electric current;
wherein each electromagnet element comprises:
a pole piece comprising:
an outer section defining an elongate air-gap facing surface of area $A_1$, perimeter $P_1$, lateral width $W_1$, and longitudinal length $L_1$, wherein $L_1$ is greater than $W_1$; and
a coil-winding section of cross-sectional area $A_2$, cross-sectional perimeter $P_2$, lateral width $W_2$, and longitudinal length $L_2$; and
an electrically conductive coil wound around the coil-winding section of the pole piece;
wherein $P_2$ is less than $P_1$, $W_2$ is substantially equal to $L_2$, and $A_2 > A_1$.

2. Apparatus according to claim 1, wherein $P_2$ is less than or equal to 0.9 times $P_1$.

3. Apparatus according to claim 1, wherein $W_2$ is greater than $W_1$.

4. Apparatus according to claim 3, wherein $W_2 \geq 1.5 \times W_1$.

5. Apparatus according to claim 1, wherein the coil-winding section has a substantially circular cross-section of diameter D.

6. Apparatus according to claim 1, wherein the air-gap facing surface is substantially rectangular.

7. Apparatus according to claim 1, wherein the first part is rotatable relative to the second part about a rotary axis and the plurality of electromagnet elements are spaced circumferentially relative to the rotary axis.

8. Apparatus according to claim 7, wherein the apparatus is an axial flux device and the air-gap facing surface extends radially relative to the rotary axis.

9. Apparatus according to claim 7, wherein the apparatus is a radial flux device and the air-gap facing surface extending axially relative to the rotary axis.

10. Apparatus according to claim 1, wherein the first part is operative to move relative to the second part along a linear axis and the plurality of electromagnet elements are axially spaced relative to the linear axis.

11. Apparatus according to claim 1, wherein the coil-winding sections of adjacent electromagnet elements are longitudinally offset to allow the air-gap facing surfaces of adjacent electromagnet elements to be positioned in close proximity.

12. Apparatus according to claim 11, wherein a first set of electromagnet elements have the coil-winding section at a first longitudinal end thereof and a second set of electromagnet elements have the coil-winding section at a second longitudinal end thereof.

13. Apparatus according to claim 1, wherein the pole piece comprises a further outer section defining a further elongate air-gap facing surface as previously defined, the further outer section being provided at an opposed end of the pole piece to the first-defined outer section.

14. Apparatus according to claim 13, wherein the second part comprises a first section facing the first-defined outer section and a second section facing the further outer section.

15. Apparatus according to claim 1, wherein the electrically conductive coil is wound around the coil-winding section with fewer than 5 layers of turns.

16. Apparatus according to claim 1, wherein the electrically conductive coil of each electromagnet element is fluid-cooled by direct contact with fluid flowing over the electrically conductive coil.

17. Apparatus for use as a motor or generator, comprising:
a first part;
a second part movable relative to the first part and spaced from the first part by an air gap; and
a plurality of laterally spaced electromagnet elements provided on the first part, each electromagnet element being operative to apply a magnetic field in the air gap in response to application of an electric current;
wherein each electromagnet element comprises:
a pole piece comprising:
an outer section defining an elongate air-gap facing surface of area $A_1$, perimeter $P_1$, lateral width $W_1$, and longitudinal length $L_1$, wherein $L_1$ is greater than $W_1$; and
a coil-winding section of cross-sectional area $A_2$, cross-sectional perimeter $P_2$, lateral width $W_2$, and longitudinal length $L_2$; and
an electrically conductive coil wound around the coil-winding section of the pole piece;
wherein:
$P_2$ is less than $P_1$ and $W_2$ is substantially equal to $L_2$; and
the outer section has a first saturation level $S_1$ and the coil-winding section has a second saturation level $S_2$, wherein $S_2$ is greater than $S_1$.

18. Apparatus according to claim 17, wherein $A_1$ is greater than $A_2$.

19. Apparatus for use as a motor or generator, comprising:
a first part;
a second part movable relative to the first part and spaced from the first part by an air gap; and
a plurality of laterally spaced electromagnet elements provided on the first part, each electromagnet element being operative to apply a magnetic field in the air gap in response to application of an electric current;

wherein each electromagnet element comprises:
  a pole piece comprising:
    an outer section defining an elongate air-gap facing surface of area $A_1$, perimeter $P_1$, lateral width $W_1$, and longitudinal length $L_1$, wherein $L_1$ is greater than $W_1$; and
    a coil-winding section of cross-sectional area $A_2$, cross-sectional perimeter $P_2$, lateral width $W_2$, and longitudinal length $L_2$; and
an electrically conductive coil wound around the coil-winding section of the pole piece;
wherein:
$P_2$ is less than $P_1$ and $W_2$ is substantially equal to $L_2$; and
$P_2$ is less than or equal to 0.9 times $P_1$.

20. Apparatus for use as a motor or generator, comprising:
a first part;
a second part movable relative to the first part and spaced from the first part by an air gap; and
a plurality of laterally spaced electromagnet elements provided on the first part, each electromagnet element being operative to apply a magnetic field in the air gap in response to application of an electric current;
wherein each electromagnet element comprises:
  a pole piece comprising:
    an outer section defining an elongate air-gap facing surface of area $A_1$, perimeter $P_1$, lateral width $W_1$, and longitudinal length $L_1$, wherein $L_1$ is greater than $W_1$; and
    a coil-winding section of cross-sectional area $A_2$, cross-sectional perimeter $P_2$, lateral width $W_2$, and longitudinal length $L_2$; and
  an electrically conductive coil wound around the coil-winding section of the pole piece;
wherein:
$P_2$ is less than $P_1$ and $W_2$ is substantially equal to $L_2$; and
$W_2$ is greater than $W_1$.

21. Apparatus according to claim 20, wherein $W_2 \geq 1.5 \times W_1$.

* * * * *